Patented Feb. 8, 1949

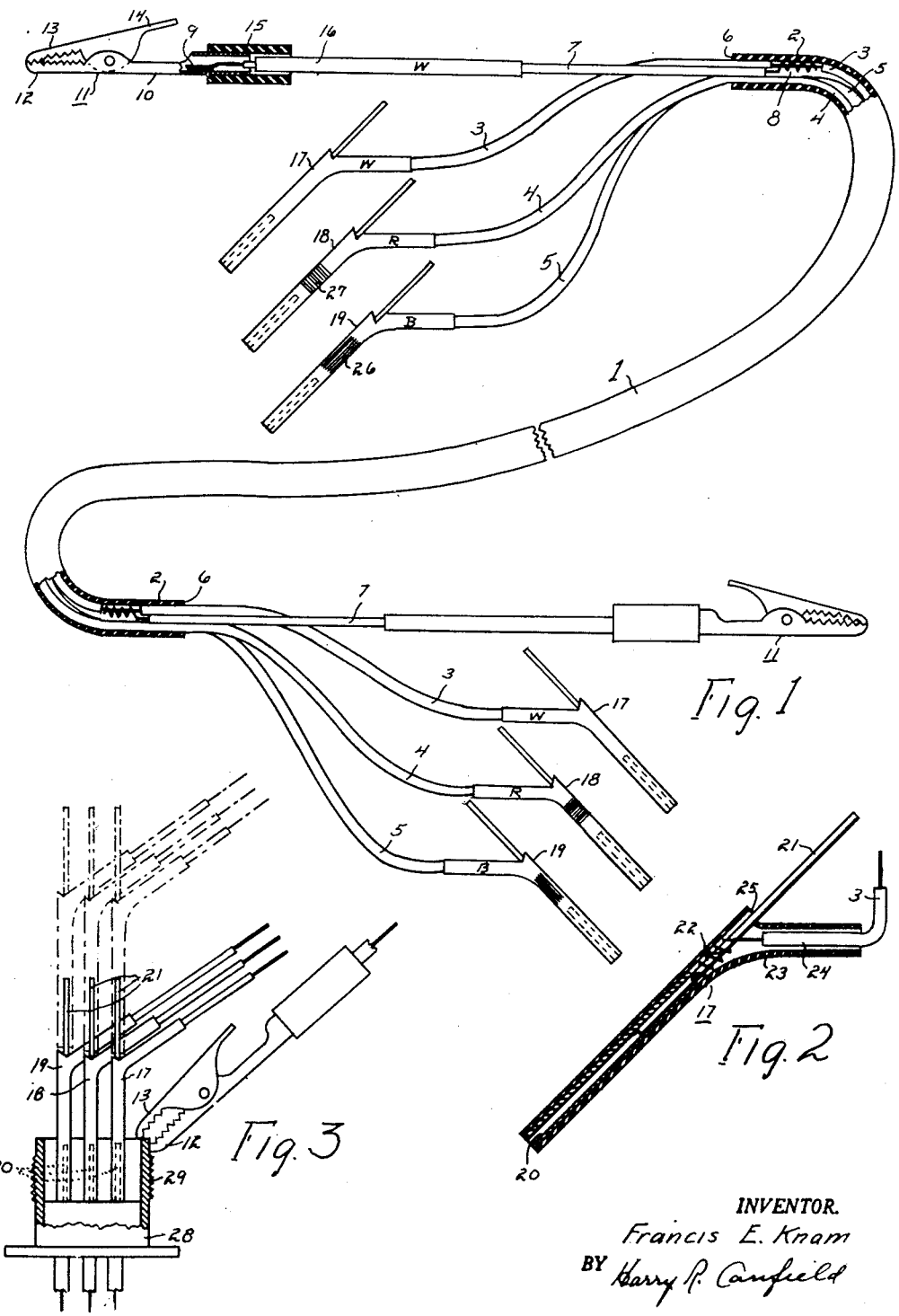

2,460,830

UNITED STATES PATENT OFFICE 2,460,830

MULTICONDUCTOR ELECTRIC HARNESS

Francis E. Knam, Cleveland, Ohio, assignor, by mesne assignments, of thirty one-hundredths to Ralph R. Roemer, thirty-five one-hundredths to Louise E. Roemer, twenty-five one-hundredths to William E. Kiefer, and ten one-hundredths to J. Everette Tompkins, all of Cleveland, Ohio.

Application March 31, 1945, Serial No. 585,895

2 Claims. (Cl. 174—70)

This invention relates to multi-conductor electric harnesses, for making quick-attachable-and-detachable electric connections between multi-point terminals.

Perhaps the most important use for the invention is for making connections to the electrically actuated indicating instruments and other apparatus on an aircraft, from a testing apparatus supplying actuating current to test them; and while the invention has other uses as will become apparent hereinafter to those skilled in the art, it will be described herein as applied to this particular use, in order to make a concise and concrete disclosure herein of one embodiment of the invention, as required by law.

The said electrically actuated instruments of various aircraft comprise tachometers, synchroscopes, etc., both single and dual, actuated by an electric generator or generators driven by the aircraft engine or engines.

The current system of the interconnected aircraft generator and instruments is generally an alternating current system, the instruments responding to the variable frequency or to the variable potential of the current; and the generators and instruments are generally provided respectively with multi-point sockets, connected together by conductors, or harnesses having multi-point plug terminals at their ends.

To test the instruments and generators and also their interconnecting conductors or harnesses, for accuracy and reliability, it has been proposed to provide a testing apparatus or testing "set" by which a generator of the set, corresponding to the engine driven generator, may be driven at variable speed and supply current at variable frequency or potential for testing the instruments and other apparatus on the aircraft; and by which the aircraft generator itself (after demounting it from the engine) may be driven through its operating range of speeds and frequencies or potentials to test it by testing its output; and by which two generators may be driven at different speeds to supply two currents at different frequencies or potentials for testing synchroscopes, etc. etc.

The testing set generator in some cases supplies current to one or more three point outlet sockets on the set; and when the set drives another or accessory generator, the latter will have a three point outlet socket; the accessory generator in some cases, as referred to, being an aircraft generator which has been demounted from the airplane engine and mounted upon the set; and while in some cases the three point outlet socket at the testing set is connected to a three point current receiving socket at an instrument or the like to test it, in other instances it is connected to a four point receiving socket; and whereas in some instances the output socket of the accessory generator may supply current over three wires from its three point outlet socket, it may sometimes deliver this current to a four point receiving socket; and in other cases it is sometimes desirable to provide a jumper type of harness interconnection between two terminal sockets, for example between the input socket of a dual tachometer when one of the input sockets receives current from the testing set.

The foregoing indicates in general the kind of interconnecting circuits which must be provided between the output sockets of a testing apparatus and the input sockets of the instruments to be tested. Besides these there are connections which must be made for testing the harnesses of the aircraft instruments, themselves.

It is believed unnecessary herein to illustrate and describe all of these tests of aircraft instruments, generators, harnesses, and other apparatus, which it may be desirable to make by a testing set. For a more complete description of such tests, reference may be had to the co-pending application of Carl F. Duerr, Jr., Serial No. 578,333, filed February 16, 1945, but from the foregoing brief review of the subject, particularly if supplemented by a reading of the said co-pending application it becomes at once apparent that a testing apparatus would have to be equipped with a great variety of interconnecting conductor harnesses to enable it to make all of the tests of which the apparatus is capable.

To be able to make all tests not only leads to complications in the number and variety of such interconnecting harnesses, but these complications are enormously multiplied by the fact that although the current delivering sockets of aircraft generators and the current receiving sockets of aircraft instruments have been to a degree standardized, there is nevertheless in use a great variety of such sockets and correspondingly a great variety of plug terminals mating therewith.

To name a few, there are socket receptacles of the three pin or male type, and sockets of this type in which one of the pins is grounded, and sockets of this type in which the surrounding metal part associated with the pins is grounded; and there are sockets with two male pins, and sockets of this type in which the surrounding metal part is grounded; and there are sockets of the four pin type, and sockets of this type in which one pin is grounded. Also, there are sockets of all of the aforementioned types and kinds in which instead of male pins they have female sleeves or tubes. Also, in each of the above described types the socket as a whole may be provided with external threads by which when the plug and socket are connected they are secured together by an external coupling nut; but there are also others in which the threads are internal and the socket and plug are secured by an internal nut.

Obviously a testing set, in order to make all of the tests of which it is capable must be provided with harnesses capable of making any desired interconnection between any two types and kinds of sockets or plug terminals, whether three wire, two wire or four wire, grounded or not grounded, and to make a jumper connection from one to another. Furthermore, in some cases this interconnection has to be made in duplicate.

The obvious construction of interconnecting harness for making any test would be a harness consisting of the requisite number of conductors for that test and having, on its opposite ends, terminals connectors for engaging the receptacles between which it is to be connected; but to provide such harness equipment would be utterly impracticable and render the testing apparatus useless in the practical sense, because of the enormous number of such interconnecting harnesses that would be necessary. It is not known exactly how many would be needed but it has been estimated that the number is greater than 200. And even if all of the necessary interconnecting harnesses of this obvious type, were supplied with the testing apparatus, and at the corresponding prohibitive expense, the mere task of selecting from such a large number the particular one applicable to any test, and its duplicate in some cases, would be entirely outside the range of practicability.

Nor would this problem of complication be solved by providing one kind of harness and one kind of terminal on its ends, and adapters to adapt these end terminals to the sockets with which they were to be used, because then there would be several hundred adapters from which to select the requisite pair, and this would be equally expensive and impracticable.

According to the present invention however this problem has been solved by a simple construction of interconnecting harness described herein.

The primary object of the invention therefore is, to provide an improved construction of interconnecting, multi-conductor electric harness for making, universally, connections between a testing apparatus and electric apparatus to be tested thereby which are provided with electric output and receiving sockets of the type provided on aircraft electric apparatus.

Other objects will be apparent to those skilled in the art to which my invention appertains.

The invention is fully disclosed in the following description taken in connection with the accompanying drawing, in which:

Fig. 1 is a view, partly broken away and partly in broken longitudinal section of a harness embodying my invention;

Fig. 2 is a fragmentary view to enlarged scale, and in longitudinal section, of an element of Fig. 1;

Fig. 3 is a view, somewhat diagrammatic illustrating the manner of applying the invention to some of its uses.

Referring to the drawing, I have shown at 1, a three-wire cable of suitable length comprising a flexible sheath 2 and containing three flexible insulated wires 3, 4, and 5; and the sheath is cut away as at 6 to allow the ends of the wires to project from the end of the sheath a suitable distance, such as, say, three inches. A short insulated flexible wire 7 is joined to the wire 3 as shown at 8 and this may be done in any suitable manner for example by rolling back the sheath 2, removing some of the insulation of the wire 3 and joining the insulated wire 7 to the insulated wire 3 and replacing the sheath; and the wire 7 projects from the sheath a suitable distance such as four or five inches.

The free end of the insulated wire 7 as shown at 9 is soldered to one leg of a spring actuated "alligator" clamp 11 and the jaws 12 and 13 of which may be separated by finger pressure on a lever handle 14. A sleeve 15 of insulating material such as hard rubber, plastic material or the like is fitted on the end of the leg 10 to cover the juncture, and a sleeve 16 of rubber or the like previously telescoped over the insulated wire 7 projects into the sleeve 15 and covers a substantial length of the wire 7.

The free ends of the wires 3, 4, and 5 have mounted thereon "hammerhead" terminals all of which may be alike, shown generally at 17, 18, and 19, and in elevation, and shown in sectional detail in Fig. 2 for one of them, for example for the wire 3.

This hammerhead terminal comprises a metal tube or sleeve 20 open at its lower end and into the upper end of which is telescoped and soldered or otherwise secured thereto a pin 21. The insulation of the insulated wire 3 is removed from the end of the wire and the wire as shown at 22 is wrapped around and soldered to or otherwise secured to the pin 21 above the upper end of the sleeve 20. A tubular cover 23 of rubber or like insulating flexible material is telescoped over the tube 20 and over the wire juncture 22 and over the end portion 24 of insulated wire 3, and the pin 21 projects out through a perforation 25 in the side wall of the tube 23 so that the wire 3 and its sleeve covering 23 project laterally from the side of the aligned pin 21 and sleeve 20. The pin 21 is of such size as to telescope into and engage the contact point sleeve of aircraft generator sockets and the sleeve 20 is of such size as to telescope over the pin of such a socket; and any suitable means not shown may be provided to allow the lower end of the sleeve 20 to resiliently expand when it is telescoped over a socket pin, such means being well known; but for example, the lower end of the sleeve 20 may be longitudinally slotted.

As shown in Fig. 1, there are corresponding hammerhead terminals 17, 18, and 19 and clamps 11 at both ends of the harness structure, and it will be understood that two corresponding terminals at opposite ends are in each case electrically connected together in the body of the harness and that the opposite clamps are likewise connected together by being attached to opposite ends of the same insulated wire. In order to identify the pairs of interconnected terminals, the external sleeves 23 thereof may have corresponding numbers or letters thereon, but it is preferred to provide sleeves of different corresponding colors, and to this end, the external sleeves of the terminals 19 may be blue, and those of the terminals 18 may be red, and those of the terminals 17 may be white; as indicated by the letters B, R, and W respectively; and this is further indicated in the drawing by the color designations blue and red at 26 and 27 respectively. The sleeve 16 on the insulated wire 7 being electrically connected to the terminal 17 is also white.

In Fig. 3 is illustrated diagrammatically the making of electrical connections to a socket 28 as a general illustrative example. This is a socket having external threads 29 and three male pins 30. The three hammerhead terminals 17, 18, and 19 at one end of the harness are connected thereto by telescoping their sleeves over the said pins. An illustrated ground connection is also shown as made by gripping the top of the socket wall by means of the alligator clamp jaws 12—13.

If the socket 28 were one having female or sleeve type connection points, then the terminals 17, 18, and 19 would be connected thereto by inserting the pins 21 thereinto.

In broken line in Fig. 3 is an illustrative example of making a jumper connection from one harness or one socket to another. The sleeve ends of the three hammerhead terminals of a jumper shown in broken line are telescoped over the pins 21 of the like harness shown in solid line. If the socket were one having female sleeves and the pins 21 were telescoped thereinto, the sleeve ends of the harness terminals would project upwardly instead of the pin ends in which case the pin ends of the jumper hammerhead terminals would be telescoped into the upwardly projecting sleeve ends as will be understood.

A plurality not to exceed three or four of the harnesses of Fig. 1 will be sufficient equipment for the above described testing set, to make all of the interconnections between the various types and kinds of sockets that may be encountered in aircraft, and the sockets on the testing set or on the accessory generators associated therewith, required in making any test.

It has been found as a practical measure by experience that where a full set of four such harnesses is wanted it is useful to have two of the conductor cables 1 of approximately 25 feet in length by which connection may be made from the testing set located outside the aircraft to instruments within the aircraft; and two others of shorter length, say two feet long, for making interconnections between the testing set and aircraft instruments when the testing set is carried up into the plane.

The principal use of the short length of harness is to make jumper connections as referred to and are such that in some cases the alligator clamp on the end, grounded to one of the hammerhead terminals, may not be needed and may be left off of one or both ends.

The harness and its terminals constructed as described above has been found to be practical for the intended purposes; but it will be apparent to those skilled in the art that changes and modifications may be made therein without departing from the spirit of the invention or sacrificing its advantages and my invention comprises all changes and modifications which come within the scope of the appended claims.

I claim:

1. An electric connection device for making connections to the pin type and sleeve type sockets of aircraft instruments comprising three flexible wires unitarily associated in parallel relation inwardly of their ends, providing three free end portions at each end of the device and one of said wires comprising two branches near its opposite ends providing a fourth free end portion at each end of the device; like terminals on each of the three free end portions at each end of the device comprising a metal sleeve open at one end and a metal pin telescoped into the other end of the sleeve and projecting therefrom and secured therein, the said free end portions of said wires joined each to a pin inwardly of its projecting end, and extending laterally therefrom, a tubular cover of flexible insulating material telescoped on the sleeve and over the wire and pin juncture and over the adjacent portion of the joined wire, the pin projecting through a perforation in the side wall of the cover; and a clamp device connected to each of the fourth free end portions.

2. An electric connection device for making connections to the pin type and sleeve type sockets of aircraft instruments comprising a plurality of flexible wires unitarily associated in parallel relation inwardly of their ends, providing a corresponding plurality of free end portions at each end of the device and one of said wires comprising two branches near its opposite ends providing a supplemental free end portion at each end of the device; like terminals on each of the said plurality of free end portions at each end of the device comprising a metal sleeve open at one end and electrically connected to a pin longitudinally aligned therewith and projecting therefrom at the other end, the internal diameter of the sleeve being substantially the same as the external diameter of the pin, the said free end portions of said wires joined each to a pin inwardly of its projecting end, and extending laterally therefrom, a tubular cover of flexible insulating material telescoped on the sleeve and over the wire and pin juncture and over the adjacent portion of the joined wire, the pin projecting through a perforation in the side wall of the cover; and a clamp device connected to each of the supplemental free end portions.

FRANCIS E. KNAM.

REFERENCES CITED

The following references are of record in the file of this patent:

UNITED STATES PATENTS

| Number | Name | Date |
|---|---|---|
| 673,474 | Pingree | May 7, 1901 |
| 1,653,728 | Oberst | Dec. 27, 1927 |
| 1,965,151 | Mueller | July 3, 1934 |
| 2,067,796 | Smith | Jan. 12, 1937 |
| 2,088,355 | Wehming | July 27, 1937 |
| 2,231,660 | Carlotti | Feb. 11, 1941 |
| 2,302,248 | Olson | Nov. 17, 1942 |
| 2,336,732 | Howard | Dec. 14, 1943 |

FOREIGN PATENTS

| Number | Country | Date |
|---|---|---|
| 90,398 | Switzerland | 1921 |
| 359,346 | Great Britain | 1931 |